United States Patent [19]  [11] 4,313,863
Handa et al.  [45] Feb. 2, 1982

[54] MODIFICATION OF ACRYLAMIDE POLYMERS

[75] Inventors: Ryoji Handa, Yokosuka; Norimasa Yoshida, Yokohama; Jun Hosoda, Yokohama; Akihisa Furuno, Yokohama, all of Japan

[73] Assignees: Nitto Chemical Industry Co. Ltd.; Mitsubishi Rayon Co., Ltd.; Diafloc Co., Ltd., all of Tokyo, Japan

[21] Appl. No.: 211,294

[22] Filed: Nov. 28, 1980

[30] Foreign Application Priority Data

Nov. 30, 1979 [JP] Japan ................................ 54/154459

[51] Int. Cl.³ ............................................. C08L 33/26
[52] U.S. Cl. ......................... 260/29.6 E; 260/33.4 R; 525/1; 525/336
[58] Field of Search ........................ 260/29.6 E; 525/1

[56] References Cited

U.S. PATENT DOCUMENTS 3,784,597  1/1974  Fujimoto et al. ................... 528/502
3,817,891  6/1974  Keas ............................... 260/29.6 E
4,146,690  3/1979  Tago et al. ......................... 528/502

Primary Examiner—Stanford M. Levin
Attorney, Agent, or Firm—Cushman, Darby & Cushman

[57] ABSTRACT

When an alkaline substance is added to and mixed with aggregates of the mutually adhering blobs of a hydrogel of an acrylamide polymer, (1) a mixing tank in which the portion to be contacted with the hydrogel of an acrylamide polymer is made of a chromium-plated material is used, and (2) to said hydrogel aggregates is added at least one compound represented by the general formulae:

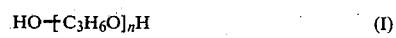

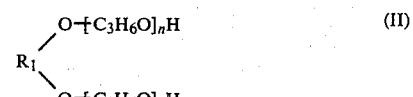

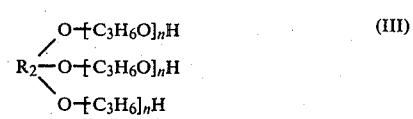

wherein $R_1$ is a residue obtained by removing two OH groups from a saturated dihydric alcohol having 2 to 4 carbon atoms, and $R_2$ is a residue obtained by removing three OH groups from a saturated trihydric alcohol having 3 to 6 carbon atoms, and having an average molecular weight of 500 to 5,000, whereby the hydrolysis of the acrylamide polymer can be achieved at a high efficiency while preventing the mutual adhesion of the hydrogel aggregates and also reducing the adhesion of the aggregates to the interior surface of the mixing tank to such an extent that there is substantially no problem of adhesion.

8 Claims, No Drawings

MODIFICATION OF ACRYLAMIDE POLYMERS

This invention relates to a reasonable method for the partial modification of the water-soluble and highly adhesive acrylamide polymers, particularly a high-concentration hydrogel of an acrylamide polymer which is difficult to transport by pipelines.

The water-soluble acrylamide polymers have been used widely for various purposes, for example, as a paper strength-enhancing agent, a tackifier for papermaking and a water-treating agent, but in recent years, a demand for such polymers as a flocculating agent for the treatment of waste water has increased sharply with an increase in social importance of treatment or disposal of waste water.

Various methods are available for the polymerization of the water-soluble monomers including acrylamide, among which solution polymerization is most widely employed for the reasons that this method is economical and simple in operation and can easily produce the polymers of such a high molecular weight as to be required for use as a flocculating agent.

In order to produce the acrylamide polymers of high molecular weights with a high productivity, it is desirable to increase the monomer concentration in the polymerization system, but if the concentration is raised above a certain level, the hydrous polymer obtained becomes a highly viscoelastic gel which is difficult to treat as a fluid.

Hyrolysis of acrylamide polymers can be carried out in the presence of an alkaline substance, but it is very hard to allow the hydrolysis reaction to proceed uniformly by adding an alkaline substance to a hydrogel of an acrylamide polymer, because of the difficulty of uniform dispersion of the alkali.

Lately, however, improvements have been made on techniques for treating these materials, and there have been proposed, for example, a method by which the hydrogel and the alkaline material are mixed by using a screw type extruder (Japanese Patent Publication No. 17668/74) and a method by which mixing is performed with stirring in an apparatus provided with a stirring mechanism comprising the ribbon-type or gate-type blades and coated with a synthetic resin at the area where the hydrogel particles and the alkaline material are contacted (Japanese Patent Application Kokai (Laid-Open) No. 5295/78).

However, according to the former method, the hydrogel is merely mixed mechanically, and hence, a reduction in the molecular weight of the polymer to a certain extent due to the shearing force given to the polymer is unavoidable, whereas according to the latter method, although it is possible to inhibit the deterioration of the polymer to a certain extent since no excessive shearing force is given because of use of a non-tacky material, the hydrogel particles impregnated with an aqueous alkali solution adhere to one another during the stirring to form a lump, so that it is difficult to obtain a good dry condition in the subsequent drying step unless the re-adhered particles are minced or removed prior to the drying step. These are disadvantageous.

As a result of extensive research on a modification method which is free of said problems, the present inventors have found that it is possible to reduce adhesion between the hydrogel aggregates or blobs and simultaneously prevent their adhesion to the internal surface of the mixing tank to such an extent that there is substantially no problem of adhesion, thereby enabling the uniform and effective mixing of said hydrogel aggregates or blobs and an alkaline material and hence allowing the intended modification to proceed with a good efficiency when the area contacted with the hydrogel aggregates or blobs of the interior surface of the mixing tank used for mixing the hydrogel aggregates or blobs and the alkaline material is chromium-plated and at least one compound selected from the group consisting of compounds represented by the following general formulae (I), (II) an (III) is added in advance of addition of the alkaline material to the hydrogel aggregates or blobs to be supplied to the mixing tank:

  (I)

  (II)

  (III)

wherein $R_1$ is a residue obtained by removing OH groups from a saturated dihydric alcohol having 2 to 4 carbon atoms, $R_2$ is a residue obtained by removing OH groups from a saturated trihydric alcohol having 3 to 6 carbon atoms, and n's are such numerical values as to give an average molecular weight of any of the compounds represented by the general formulae (I), (II) and (III) within the range of 500 to 5,000.

An object of this invention is to provide a method for producing a partially hydrolyzed acrylamide polymer which is one of the acrylamide polymers.

Another object of this invention is to provide a method for modifying an acrylamide polymer with an alkaline substance with allowing the acrylamide polymer particles not to adhere to one another or to the mixing tank.

Other objects and advantages of this invention will become apparent from the following description.

According to this invention, there is provided a method for modifying an acrylamide polymer with an alkaline substance by adding the alkaline substance to hydrogel aggregates of said acrylamide polymer to hydrolyze the polymer, characterized in that (1) the mixing tank has a chromium-plated internal surface with which the acrylamide polymer hydrogel aggregates contact during the mixing, and (2) at least one compound selected from the group consisting of the compounds represented by the general formulae (I), (II) and (III) is added to said hydrogel aggregates.

The term "hydrogel aggregate" used herein means an aggregate of the blobs formed by mincing the mass of a hydrogel polymer by a suitable means, for example, by an extruder such as shown in U.S. Pat. No. 3,905,122, and even though such an aggregate is apparently in the form of a string or a sheet or block made by entanglement of the said strings, there still remain the boundary surfaces between the individual particles.

Although the mechanism of action in this invention is not known definitely, the fact is that when a material other than that of this invention, for example, stainless steel is used for the internal surface of the mixing tank with which the hydrogel contacts, the hydrogel adheres to the internal surface of the mixing tank even if at least one compound selected from the group consisting of the compounds represented by the general formulae (I), (II) and (III) is added. Also, even if the internal surface is chromium-plated, there still takes place adhesion of the hydrogel to the internal surface of the mixing tank or the gel particles adhere to one another to form lumps unless said compound or compounds are added. Thus, adhesion of the hydrogel onto the internal surface of the mixing tank can be prevented only by the synergistic effect obtained by use of a chromium-plated material for the internal surface of the mixing tank and addition of at least one compound selected from the group consisting of the compounds represented by the above-mentioned general formulae (I), (II) and (III), and it is also possible to prevent re-adhesion of the hydrogel blobs even in case a suitable baffle plate is provided on the internal surface of the mixing tank or mixing is performed under application of shearing force, so that if an alkaline substance is added under such conditions, there occurs no local residence of the alkaline substance and the substance is dispersed uniformly to allow favorable and uniform progress of the hydrolysis reaction.

It is of great significance that the said two prominent effects, that is, prevention of adhesion of the hydrogel blobs to a metal material and prevention of mutual adhesion of said hydrogel blobs, are obtained, and these are the characteristic features of the present invention.

The compounds represented by the general formulae (I), (II) and (III) can be obtained by reacting propylene oxide with water, a dihydric alcohol and a trihydric alcohol, respectively. The properties of these compounds may vary greatly depending on the molecular weight, but for the purpose of this invention, the compounds have a molecular weight within the range of 500 to 5,000, preferably 1,000 to 4,000. If the molecular weight is below said range, there is provided no satisfactory effect on the prevention of adhesion of the hydrogel. This is considered attributable to the fact that the compound is dissolved in water in the hydrogel due to the great hydrophilicity of the compound and thus penetrates into the gel. Too large a molecular weight cannot also provide a satisfactory effect for preventing the deposition of the gel, and this is considered ascribable to the fact that, due to an increased viscosity and a small hydrophilicity of the compound per se the compound is difficult to distribute on the surfaces of the particles of the hydrogel aggregate.

From these facts, it may be said that the compounds of the general formulae (I), (II) and (III) used in this invention can display their effects when their molecular weights are within the range of 500 to 5,000 where the hydrophilic and hydrophobic properties of such compounds are balanced properly.

Although the acting mechanisms of these compounds and the alkaline substance when used in combination have not yet been elucidated, it is considered that the alkaline substance used penetrates into the hydrogel blobs in the form an aqueous solution to induce a uniform hydrolysis reaction while the compound is brought into such a state that it coats the surfaces of the hydrogel blobs to exhibit an effect of inhibiting the re-adhesion of the blobs.

A typical example of the compounds represented by the general formula (I) is polypropylene glycol.

The symbols used in the general formulae (II) and (III) are as defined above. As examples of the saturated dihydric alcohols having 2 to 4 carbon atoms, there may be mentioned ethylene glycol, propylene glycol, tetramethylene glycol and 2,3-butanediol, and the examples of the saturated trihydric alcohols having 3 to 6 carbon atoms include glycerin, 2-methyl-2-oxymethyl-1,3-propanediol and 2-ethyl-2-oxymethyl-1,3-propanediol. Among them, glycerin is most recommendable because of its easy availability and low cost.

The hydrogel of acrylamide polymer to be treated in this invention has little fluidity and possesses some extent of hardness. If the concentration of the starting monomer is too low during the polymerization, the gel becomes too soft and hence is difficult to handle. For instance, in the case of an acrylamide polymer having an average molecular weight of about 8,000,000, the lower limit of the concentration of the starting monomer is about 18% by weight.

The acrylamide polymers treatable in this invention are principally polyacrylamides, but the invention can, of sourse, be applied to copolymers of acrylamide and other vinyl monomers copolymerizable with acrylamide.

As the said other copolymerizable vinyl monomers, there may be used, for example, acrylic and methacrylic acids and their esters, acrylonitrile, methacrylonitrile, hydroxyethyl acrylate and methacrylate and dimethylaminoethyl methacrylate.

When polymerizing these monomers, the concentration thereof is adjusted to about 18 to 40%, preferably about 20 to 35%. It is to be noted, however, that the above-mentioned range is not critical in the strict sense because the gel hardness is variable depending upon the monomer composition and the molecular weight of the polymer.

The compound of the general formula (I), (II) or (III) may be used either alone or in admixture of two or more, and the amount of said compound added is preferably 0.01 to 0.5%, more preferably 0.02 to 0.3%, by weight based on the weight of the polymer to be treated. More specifically, a satisfactory effect is obtained by using said compound in an amount of about 0.02 to 0.1% by weight in the following cases (a) and (b) and about 0.05 to 0.3% by weight in the following case (c). If the amount of the compound added is less than the above-mentioned ranges, no satisfactory effect is obtained, while too large an amount of the compound added causes trouble in powdering of the product because the normally liquid additives remain in a relatively large amount in the powdered dry product.

As for the method of adding the compound, there may be employed any method which is capable of adhering the compound to the hydrogel aggregate, such as:

(a) adding the compound to the hydrogel before feeding the hydrogel to the mixing tank, (b) adding the compound to the hydrogel after feeding the hydrogel to the mixing tank, (c) previously adding the compound to acrylamide (and other vinyl monomers) before the polymerization of the same, and the like.

The mixing of an alkaline substance with the aggregate formed by adhering hydrogel blobs to one another may be effected by stirring them with gate-type or ribbon-type stirring blabes in a mixing tank.

After performing such mixing of the alkaline substance with said aggregate sufficiently for a predetermined period of time, the thus mixed hydrogel blobs are dried by a dryer to obtain a dry polymer product.

The hydrolysis reaction starts upon contact of the hydrogel with the alkaline substance, and it is considered that such reaction proceeds continuously through the mixing and drying steps.

It is, of course, possible to use, for example, a rotary dryer for effecting said mixing without using any separate mixing tank. More concretely, it is possible to obtain a desired partially hydrolyzed dry acrylamide polymer product by using a dryer which is chromium-plated at the area of its internal surface contacted with the hydrogel blobs and which has a device (such as a baffle plate) capable of producing a suitable shearing force, and by supplying thereto an aggregate of the hydrogel blobs, at least one compound represented by the general formula (I), (II) or (III) and an alkaline substance, mixing them at a predetermined temperature for a predetermined period of time and performing drying upon completion of said mixing operation.

Needless to say, it is possible in performing the method of this invention to uniformly mix the additives such as an insolubilization inhibitor, antioxidant, etc., and, in some cases, other polymer reaction reagents for certain specific purposes.

This invention is explained in further detail below referring to Examples, which are merely by way of illustration and not by way of limitation.

EXAMPLE 1

An aqueous solution containing 25% by weight of acrylamide was subjected to bulk polymerization in a usual way by using a redox initiator to obtain a mass of hydrogel. About 30 kg of this gel was broken into blobs by an extruder like a mincing machine provided with a breaker plate having pores of about 4 mm in diameter and also with a cutter (in this Example, said blobs were in the form of a string or an aggregate of strings due to their mutual adhesion), and aggregates of these gel blobs were transferred into a container of 450 mm in diameter and 700 mm in height, the internal surface of which was chromium-plated.

A stirrer having the gate-like blades of about 400 mm in diameter was set in said container, and 10 g of polypropylene glycol (average molecular weight: 2,000) and 2.5 kg of a 25% by weight aqueous solution of sodium hydroxide were supplied to said container and stirred at a rate of about 10 r.p.m. for 2 hours.

The hydrogel was initially in the form of an aggregate, but it was observed that the gel was dispersed into small particles in several minutes and the aqueous alkali solution was mixed uniformly with the particles. Two hours later, the gel particles were transferred to a dryer, but there was seen almost no adhesion of the gel particles to the internal suurface of the mixing tank and to the surfaces of the stirring blades. Also, there was produced no agglomerate or lump of gel due to re-adhesion of the particles. The product was crushed and a 1% by weight aqueous solution thereof was prepared. No insoluble matter was observed. The solution viscosity as measured by using a Brookfield type viscometer was 13,500 c.p.s. and the degree of hydrolysis was 14.5 mole %.

For comparison, the behavior of the gel in the case of using a non-chromium-plated container (Comparative Example) was also observed.

COMPARATIVE EXAMPLE

The procedure of Example 1 ws repeated, except that the polyproplylene glycol (PPG) was not added. The results of the observation are shown in the following table.

|  | Example 1 | | Comparative Example | |
|---|---|---|---|---|
|  | This invention | Control | | |
| Material of mixing tank and stirring blades | Chromium-plated | Stainless steel (SUS304) | Chromium-plated | Stainless steel (SUS304) |
| PPG Deposition on mixing tank and stirring blade | Added Little | Added Much | Not added Much | Not added Profuse |
| Agglomeration of gel particles | None | None | Remarkable | Remarkable |

EXAMPLE 2

About 30 kg of hydrogel was formed into blobs by an extruder in the same way as in Example 1. In this Example, however, 10 g of a compound (average molecular weight: about 1,500) of the following formula:

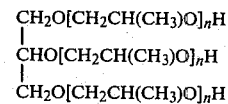

was sprinkled into the hopper of the extruder. The obtained aggregate of the hydrogel particles was fed to a rotary cylindrical dryer of about 50 cm in diameter and about 100 cm in length and having a chromium-plated internal surface.

2.5 Kg of a 40% by weight aqueous solution of sodium hydroxide was sprinkled to the hydrogel in the dryer and they were mixed by rotating the dryer for about three hours without feeding hot air. The gel aggregate was dispersed into particles in several minutes after starting the rotation of the dryer.

After completion of the mixing operation, hot air at 80° C. was supplied to the dryer while keeping it rotating and then hot air of 70° C. was further supplied for a period of 10 hours to complete drying. The water content at this point was 4.6% by weight.

There existed no gel agglomerate in the obtained dry product and also there was seen almost no deposit on the internal surface of the dryer. The product was crushed and a 1% by weight aqueous solution thereof was prepared, but there existed no insoluble matter. The solution viscosity as measured by using a Brookfield type viscometer was 16,000 c.p.s. and the degree of hydrolysis was 28.5 mole %.

Example 3

About 10 kg of an aggregate of gel blobs obtained in the same way as in Example 1 was supplied into a 50-liter-capacity ribbon blender, the internal surface of which was chromium-plated at the rotating section, and then 2 g of polypropylene glycol (average molecular weight: 2,000) and 350 g of a 20% by weight aqueous solution of sodium carbonate were added to said aggregate and mixed at a low speed for about 15 minutes. The alkali was mixed uniformly, and there was seen no agglomerate or lump of the gel particles nor any adhesion of the particles to the container. A part of this gel was sampled out and dried and a 1% by weight aqueous solution thereof was formed. There existed no insoluble matter, and the solution viscosity was 6,200 c.p.s. and the degree of hydrolysis was 4.3 mol%.

EXAMPLE 4

About 30 kg of an aggregate of gel blobs obtained in the same way as in Example 1, except that 500 ppm. of polypropylene glycol (molecular weight: 2,000) was added, was transferred to a drum type granulator having a capacity of about 150 liters, the internal surface of which was chromium-plated, and the materials were mixed by rotating the granulator for about 20 minutes while spraying thereto 1.2 kg of a 40% by weight aqueous solution of sodium hydroxide. The gel aggregate was dispersed into particles without forming any agglomerate and also without causing any adhesion to the drum surface. The alkali was seen dispersed uniformly.

A part of this gel was collected and dried and a 1% by weight aqueous solution thereof was formed, but no insoluble matter existed therein. The solution had a viscosity of 13,000 c.p.s. and the degree of hydrolysis was 13.8 mol%.

What is claimed is:

1. A method for modifying an acrylamide polymer with an inorganic alkaline substance by adding the inorganic alkaline substance to the hydrogel aggregates of the acrylamide polymer in a mixing tank to hydrolyze the polymer, characterized in that the mixing tank has a chromium-plated internal surface with which the hydrogel aggregates of the acrylamide polymer contact, and that at least one compound selected from the group consisting of the compounds represented by the following general formulae (I), (II) and (III):

$$HO[C_3H_6O]_nH \quad (I)$$

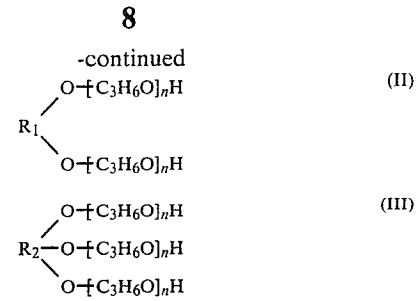

wherein $R_1$ is a residue obtained by removing two OH groups from a saturated dihydric alcohol having 2 to 4 carbon atoms, and $R_2$ is a residue obtained by removing three OH groups from a trihydric alcohol having 3 to 6 carbon atoms, and n's are such numerical values that any of the compounds represented by the general formulae (I), (II) and (III) has an average molecular weight within the range of 500 to 5,000, is added to said hydrogel aggregates as an anti-tack agent.

2. The method according to claim 1, wherein at least one compound represented by the general formula (I), (II) or (III) having a molecular weight within the range of 1,000 to 4,000 is used as the anti-tack agent.

3. The method according to claim 1, wherein the anti-tack agent is used in an amount of 0.01 to 0.5% by weight based on the weight of the polymer.

4. The method according to claim 1, 2 or 3, wherein the anti-tack agent is polypropylene glycol.

5. The method according to claim 1, 2 or 3, wherein the anti-tack agent is a compound represented by the general formula (II) in which $R_1$ is the residue of ethylene glycol, propylene, glycol, tetramethylene glycol or 2,3-butanediol.

6. The method according to claim 1, 2 or 3, wherein the anti-tack agent is a compound represented by the general formula (III), in which $R_2$ is the residue of glycerin, 2-methyl-2-oxymethyl-1,3-propanediol, or 2-ethyl-2-oxymethyl-1,3-propanediol.

7. The method of claim 1 wherein the inorganic alkaline substance is sodium hydroxide.

8. The method of claim 1 wherein the inorganic alkaline substance is sodium carbonate.